Patented Aug. 19, 1941

2,253,342

UNITED STATES PATENT OFFICE 2,253,342

MONO-ETHERS OF UNSATURATED DIHYDRIC ALCOHOLS AND METHOD FOR PRODUCING THE SAME

Louis A. Mikeska, Westfield, and Erving Arundale, Union, N. J., assignors to Standard Oil Development Company, a corporation of Delaware No Drawing. Application November 13, 1939, Serial No. 304,114

15 Claims. (Cl. 260—615)

The present invention relates to mono-ethers of unsaturated dihydric alcohols and a process for the production thereof. The unsaturated hydroxy ethers of this invention are obtained by the condensation of tertiary alkenyl ethers with formaldehyde in the presence of an inorganic metal halide catalyst or a metal salt of a halogenated organic acid, the metal constituents of which are selected from the second or fourth group of the periodic table and which may be dissolved in a non-aqueous inert solvent.

The term "tertiary alkenyl ether" mentioned herein is to be interpreted as meaning any unsaturated ether containing a tertiary carbon atom adjoining the double bond, said tertiary carbon atom having a methyl group attached thereto.

The reaction for the preparation of unsaturated hydroxy ethers may be illustrated by the following equation for the condensation of dimethallyl ethyl ether with formaldehyde:

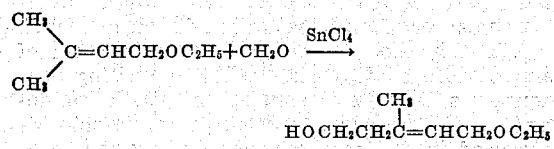

Other unsaturated ethers which may be condensed with formaldehyde include:

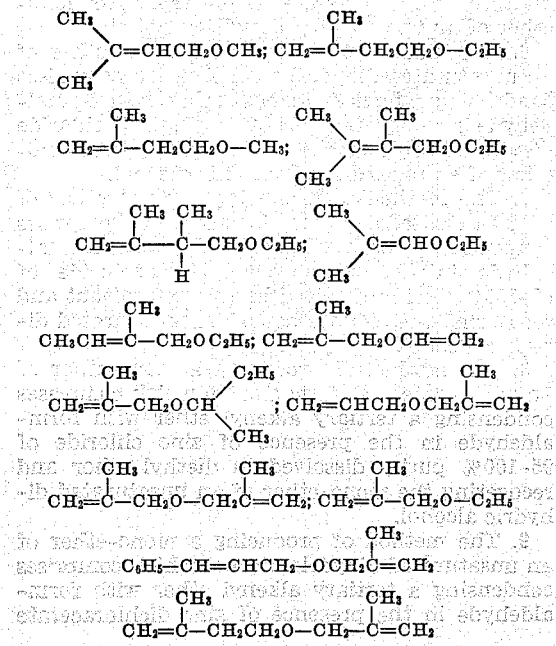

The unsaturated hydroxy ethers prepared by the process of this invention are novel hydroxy tertiary alkenyl ethers and have the general formula—

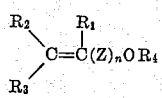

where $n$ is 0 or 1; Z is a bivalent hydrocarbon radical such as—

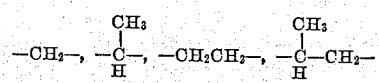

and $R_2$ and $R_3$ are hydrogen atoms, or alkyl, aryl, aralkyl, or alkaryl groups, and $R_1$ is an ethylol group ($-CH_2CH_2OH$), while, when $R_2$ is an ethylol group, $R_1$ is a hydrogen atom, or an alkyl, aryl, aralkyl, or alkaryl group, and $R_3$ is an alkyl, aryl, aralkyl, or alkaryl group. $R_4$ is any hydrocarbon radical.

The condensation reactions are catalyzed by inorganic metal halides, or the metal salts of halogenated organic acids, the metal elements of which are selected from the second and fourth groups of the periodic table. Such catalysts include zinc chloride, stannic chloride, zinc dichloracetate, silicon tetrachloride. The catalyst employed should be at least 95% pure, while the anhydrous salt is to be preferred. Various organic liquids, such as ethers, chlorinated hydrocarbons, volatile saturated hydrocarbons, may be used as solvents for the catalyst, but such solvents must be inert and indifferent to both the reactants and the catalyst. Diethyl ether, di-isopropyl ether, chloroform, ethylene dichloride, carbon tetrachloride, naphtha, etc. are specific examples of the solvents which may be employed.

The reaction usually proceeds readily at room temperature but may also be carried out at temperatures below or slightly above room temperature. Elevated temperatures are to be avoided because, under such conditions, by-product formation becomes the major reaction. In order to prevent the formation of ether derivatives of meta-dioxanes in these condensations, the reaction mixture should be anhydrous at the outset and the catalyst should be non-acidic under the conditions employed. Various dessicants, such as anhydrous sodium sulfate, calcium sulfate, etc. may be added to the reaction mixture in order to keep said mixture substantially anhydrous.

Gaseous formaldehyde, paraformaldehyde, trioxymethylene, isomers of trioxymethylene, or any other compound which will decompose to yield anhydrous formaldehyde under the reaction conditions may be used as the source of formaldehyde in this reaction.

When the unsaturated ether is relatively non-volatile at room temperature, the reaction may be carried out in any closed vessel equipped with means for securing intimate contact between the reactants and the catalyst. However, when the ether is quite volatile at ordinary temperatures and pressures, equipment capable of retaining the vapors and providing efficient contact between the reactants and the catalyst by agitation must be used.

The condensations of unsaturated ethers with formaldehyde (using metal halides or the metal salts of halogenated organic acids as catalysts) may also be carried out in the presence of substantially anhydrous organic acids or acid anhydrides whereby mono ester-mono ethers of unsaturated dihydric alcohols will be produced.

The unsaturated ethers and formaldehyde condense in approximately equimolecular proportions, so that the unsaturated ether-formaldehyde molar ratio should be at least 1:1 for best results. The amount of catalyst used depends upon the nature of the catalyst, but usually ranges from 0.01 to 0.2 mole of catalyst per mole of formaldehyde. Larger amounts may be used, if desired, without interfering with the reaction.

Chlorinated hydrocarbons appear to be the best solvents for the catalyst, and, of these chlorinated solvents, chloroform is to be preferred. Diethyl ether has been found to be a good solvent when using zinc salts as catalysts.

The reaction is carried out by maintaining intimate contact between the unsaturated ether, trioxymethylene (or other source of formaldehyde), inert solvent, and catalyst until no more formaldehyde will react. The reaction mixture is then filtered to remove any unreacted aldehyde (which may be recycled) and the filtrate is neutralized with an alkali. The product is then isolated from the neutralized filtrate by the combination of steam distillation and solvent extraction steps to be more particularly described hereinafter. The reaction may also be carried out as a continuous process.

The unsaturated hydroxy ethers prepared according to this invention are generally liquid at ordinary temperatures. They are completely soluble in petroleum fractions and most organic solvents but are only slightly soluble in water. They may be employed as solvents for lacquers, perfumes, and the like. They may also be used as blending agents for motor fuels.

The following example is given for the purpose of illustrating the invention:

60 parts of trioxymethylene, 180 parts of dimethallyl ethyl ether, and 865 parts of chloroform were thoroughly mixed in a pressure container. 23 parts of fuming stannic chloride dissolved in 38 parts of chloroform (all parts by weight) were then added, the container was closed, and the mixture was agitated for 6.5 hours. The reaction mixture was then removed from the reactor and was filtered. The filtrate was neutralized with dilute carbonate solution and the neutral solution was steam distilled, the distillate being obtained as two layers. The lower chloroform-unreacted ether layer was drawn off and dried. This dried material was fractionated to recover the chloroform and the unreacted dimethallyl ethyl ether (66 parts by weight). The fractionation residue contained a small amount of the desired product. The steam distillation residue (two layers) was ether extracted. The extract was evaporated, and the residue was vacuum distilled to yield 100 parts of ethoxymethyl isopropenyl ethyl alcohol ($HOCH_2CH_2C(CH_3)=CHCH_2OC_2H_5$) boiling at 88–90° C. at 1.5 mm.

The foregoing description and example are given for illustrative purposes and are not to be construed as limiting upon the invention.

What is claimed is:

1. The method of producing a mono-ether of an unsaturated dihydric alcohol which comprises reacting a tertiary alkenyl ether with formaldehyde in the presence of a catalyst chosen from the group consisting of substantially anhydrous inorganic metal halides and metal salts of halogenated organic acids, the metal constituents of which are elements chosen from the second and fourth groups of the periodic table.

2. The method of producing a mono-ether of an unsaturated dihydric alcohol which comprises reacting a tertiary alkenyl ether with formaldehyde in the presence of an inorganic metal halide catalyst, the metal constituent of which is an element of the fourth group of the periodic table.

3. The method of producing a mono-ether of an unsaturated dihydric alcohol which comprises reacting a tertiary alkenyl ether with formaldehyde in the presence of a metal salt of a halogenated organic acid, the metal constituent of which is an element of the fourth group of the periodic table.

4. The method of producing a mono-ether of an unsaturated dihydric alcohol comprising reacting a tertiary alkenyl ether with formaldehyde in an inert solvent in the presence of a catalyst chosen from the group consisting of substantially anhydrous inorganic metal halides and metal salts of halogenated organic acids, the metal constituents of which are chosen from the second and fourth groups of the periodic table, and recovering the ether of an unsaturated dihydric alcohol.

5. The method of producing a mono-ether of an unsaturated dihydric alcohol comprising condensing a tertiary alkenyl ether with formaldehyde in the presence of fuming stannic chloride dissolved in an inert solvent, diluting the reaction mixture with water, neutralizing the diluted mixture with an alkali, and recovering the mono-ether of an unsaturated dihydric alcohol.

6. The method of producing a mono-ether of an unsaturated dihydric alcohol which comprises condensing a tertiary alkenyl ether with formaldehyde in the presence of fuming stannic chloride dissolved in chloroform and recovering the mono-ether of an unsaturated dihydric alcohol.

7. The method of producing a mono-ether of an unsaturated dihydric alcohol which comprises condensing a tertiary alkenyl ether with formaldehyde in the presence of zinc chloride of 95–100% purity dissolved in an inert solvent and recovering the mono-ether of an unsaturated dihydric alcohol.

8. The method of producing a mono-ether of an unsaturated dihydric alcohol which comprises condensing a tertiary alkenyl ether with formaldehyde in the presence of zinc chloride of 95–100% purity dissolved in diethyl ether and recovering the mono-ether of an unsaturated dihydric alcohol.

9. The method of producing a mono-ether of an unsaturated dihydric alcohol which comprises condensing a tertiary alkenyl ether with formaldehyde in the presence of zinc dichloracetate dissolved in diethyl ether and recovering the mono-ether of an unsaturated dihydric alcohol.

10. The method of producing a mono-ether of an unsaturated dihydric alcohol which comprises condensing a tertiary alkenyl ether with formaldehyde in an inert solvent in the presence of a catalyst chosen from the group consisting of inorganic metal halides and metal salts of halogenated organic acids, the metal constituents of which are selected from the second and fourth groups of the periodic table, filtering the reaction mixture, diluting the filtrate with water, neutralizing the diluted mixture with an alkali, steam distilling the neutralized filtrate, and recovering a mono-ether of an unsaturated dihydric alcohol from the steam distillate.

11. The method of producing a mono-ether of an unsaturated dihydric alcohol which comprises condensing a tertiary alkenyl ether with formaldehyde in an inert solvent in the presence of a catalyst chosen from the group consisting of inorganic metal halides and metal salts of halogenated organic acids, the metal constituents of which are selected from the second and fourth groups of the periodic table, filtering the reaction mixture, neutralizing the filtrate with dilute alkali solution, steam distilling the neutralized filtrate, and recovering the mono-ether of an unsaturated dihydric alcohol from the steam distillation residue by solvent extraction.

12. The method of producing ethoxymethyl isopropenyl ethyl alcohol which comprises condensing dimethallyl ethyl ether with formaldehyde in the presence of stannic chloride dissolved in an inert solvent and recovering the ethoxymethyl isopropenyl ethyl alcohol.

13. As a composition of matter, a mono-ether of an unsaturated dihydric alcohol having the general formula—

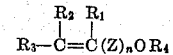

where $R_1$, $R_2$ and $R_3$ are substituents selected from the group consisting of hydrogen, ethylol and alkyl, aryl, aralkyl and alkaryl groups and at least one R is ethylol which R is attached to a tertiary carbon atom; Z is a bivalent aliphatic hydrocarbon radical; $n$ is a number selected from the group consisting of 0 and 1; and $R_4$ is a hydrocarbon radical.

14. As a composition of matter, ethoxymethyl isopropenyl ethyl alcohol.

15. As a composition of matter, ethoxy isopropenyl ethyl alcohol.

LOUIS A. MIKESKA.
ERVING ARUNDALE.